US008711099B2

(12) United States Patent
Wood et al.

(10) Patent No.: US 8,711,099 B2
(45) Date of Patent: Apr. 29, 2014

(54) HANDHELD ELECTRONIC COMMUNICATION DEVICE HAVING SLIDING DISPLAY (75) Inventors: Todd Andrew Wood, Waterloo (CA); Jodie Elizabeth Fletcher, Ottawa (CA)

(73) Assignee: Blackberry Limited, Waterloo (CA)

( * ) Notice: Subject to any disclaimer, the term of this patent is extended or adjusted under 35 U.S.C. 154(b) by 365 days.

(21) Appl. No.: 12/858,528

(22) Filed: Aug. 18, 2010

(65) Prior Publication Data
US 2011/0273374 A1 Nov. 10, 2011

Related U.S. Application Data (60) Provisional application No. 61/333,106, filed on May 10, 2010.

(51) Int. Cl.
*G06F 3/02* (2006.01)
*G09G 5/00* (2006.01)

(52) U.S. Cl.
USPC .......................... 345/169; 455/566; 455/575.1

(58) Field of Classification Search
CPC .......................... G06F 1/1626; H04M 1/72519
See application file for complete search history.

(56) References Cited

U.S. PATENT DOCUMENTS

| | | |
|---|---|---|
| 5,900,090 A | 5/1999 | Parulski et al. |
| 6,243,595 B1 | 6/2001 | Lee et al. |
| 6,332,084 B1 | 12/2001 | Shaanan et al. |
| 6,850,226 B2 | 2/2005 | Finke-Anlauff |
| 6,963,756 B2 | 11/2005 | Lubowicki et al. |
| 7,388,578 B2 | 6/2008 | Tao |

(Continued)

FOREIGN PATENT DOCUMENTS

| | | |
|---|---|---|
| EP | 1603311 A2 | 12/2005 |
| EP | 1858236 A1 | 11/2007 |

(Continued)

OTHER PUBLICATIONS

Extended European Search Report for EP 10173174.3 dated Dec. 14, 2010.
JP 20030298694 A—Abstract—Portable Electronic Device, Published on year 2003.
Mougeot, Charles—Canadian Intellectual Property Office, "Examiners Requisition" for Canadian Patent Application No. 2,736,698 dated Oct. 11, 2013.

*Primary Examiner* — Kent Chang
*Assistant Examiner* — Benjamin Morales Fernandez
(74) *Attorney, Agent, or Firm* — Ridout & Maybee LLP (57) ABSTRACT A handheld electronic device comprising a housing having a keyboard support member and a base, the base having a first section spaced apart from and opposing the keyboard support member to define a cavity therebetween, the base having a second section that extends from the first section beyond an open end of the cavity, the housing further comprising opposed first and second sidewalls, the first sidewall protruding from a first peripheral side edge of the second section of the base and the second sidewall protruding from a second peripheral side edge of the second section of the base. A display assembly is slidably mounted to the housing and comprising a display screen on a front face thereof, the display assembly being slidable between a retracted position and an extended position, wherein in the retracted position a first portion of the display screen is received within the cavity facing towards the keyboard support member and a second portion of the display screen is viewable outside of the cavity and disposed between the first and second sidewalls, and in the extended position the first portion and the second portion of the display screen are viewable outside of the cavity.

18 Claims, 8 Drawing Sheets

(56) References Cited

U.S. PATENT DOCUMENTS

| | | |
|---|---|---|
| 7,400,345 B2 | 7/2008 | Cok |
| 7,580,736 B2 | 8/2009 | Ronkko et al. |
| 7,692,667 B2* | 4/2010 | Nguyen et al. ............... 345/619 |
| 8,165,647 B2* | 4/2012 | Cho et al. .................. 455/575.3 |
| 2002/0006813 A1* | 1/2002 | Lubowicki et al. ........... 455/566 |
| 2004/0032382 A1 | 2/2004 | Cok et al. |
| 2004/0070558 A1 | 4/2004 | Cok et al. |
| 2004/0150590 A1 | 8/2004 | Cok et al. |
| 2004/0229662 A1* | 11/2004 | Chadha ...................... 455/575.1 |
| 2005/0054397 A1* | 3/2005 | Kim et al. .................. 455/575.4 |
| 2005/0090298 A1* | 4/2005 | Park et al. .................. 455/575.4 |
| 2005/0096082 A1 | 5/2005 | Chang |
| 2005/0233785 A1* | 10/2005 | Park et al. .................. 455/575.4 |
| 2005/0266897 A1* | 12/2005 | Ahn et al. .................. 455/575.1 |
| 2007/0024576 A1 | 2/2007 | Hassan |
| 2007/0093281 A1* | 4/2007 | Park et al. .................. 455/575.4 |
| 2007/0115255 A1 | 5/2007 | Pan |
| 2007/0177404 A1 | 8/2007 | Daniel et al. |
| 2007/0247798 A1 | 10/2007 | Scott, II |
| 2007/0265031 A1* | 11/2007 | Koizumi et al. ........... 455/556.1 |
| 2007/0285401 A1 | 12/2007 | Ohki et al. |
| 2007/0287504 A1* | 12/2007 | Lim et al. ...................... 455/566 |
| 2008/0144265 A1 | 6/2008 | Aoki |
| 2008/0207273 A1 | 8/2008 | Huo |
| 2008/0226970 A1* | 9/2008 | Kim et al. ........................ 429/96 |
| 2008/0268901 A1 | 10/2008 | Miramontes |
| 2009/0011798 A1* | 1/2009 | Yamada ........................ 455/566 |
| 2009/0042609 A1* | 2/2009 | Bloebaum .................. 455/556.1 |
| 2009/0075692 A1* | 3/2009 | Park et al. .................. 455/556.1 |
| 2009/0154082 A1 | 6/2009 | Nurmi et al. |
| 2009/0156264 A1* | 6/2009 | Cho et al. ...................... 455/566 |
| 2009/0174628 A1 | 7/2009 | Wang et al. |
| 2009/0195499 A1 | 8/2009 | Griffin |
| 2009/0207184 A1* | 8/2009 | Laine et al. .................... 345/619 |
| 2009/0231785 A1 | 9/2009 | Li et al. |

FOREIGN PATENT DOCUMENTS

| | | |
|---|---|---|
| EP | 1931118 A2 | 6/2008 |
| EP | 1944949 A1 | 7/2008 |
| GB | 2417851 A | 3/2006 |
| WO | 03030497 A2 | 4/2003 |
| WO | 2008074358 A1 | 6/2008 |
| WO | 2010044902 A1 | 4/2010 |

* cited by examiner

HANDHELD ELECTRONIC COMMUNICATION DEVICE HAVING SLIDING DISPLAY

FIELD OF TECHNOLOGY

The present disclosure relates to electronic devices, including handheld electronic communication devices having a sliding display.

BACKGROUND

Electronic devices, including handheld electronic communication devices, have gained widespread use and may provide a variety of functions including, for example, telephonic, electronic text messaging, personal information manager (PIM) application functions, mobile web browsing, and audio and video playback, among other things.

Devices such as smart phones are generally intended for handheld use and ease of portability. Smaller devices are generally desirable for portability which typically places restrictions on the size of display screens used in such devices.

BRIEF DESCRIPTION OF THE DRAWINGS

Embodiments of the present disclosure will now be described, by way of example only, with reference to the attached Figures, wherein.

DETAILED DESCRIPTION

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limited to the scope of the example embodiments described herein.

According to one example is a handheld electronic device including a housing having a keyboard support member and a base, the base having a first section spaced apart from and opposing the keyboard support member to define a cavity therebetween, the base having a second section that extends from the first section beyond an open end of the cavity, the housing further including opposed first and second sidewalls, the first sidewall protruding from a first peripheral side edge of the second section of the base and the second sidewall protruding from a second peripheral side edge of the second section of the base. A display assembly is slidably mounted to the housing and having a display screen on a front face thereof, the display assembly being slidable between a retracted position and an extended position, wherein in the retracted position a first portion of the display screen is received within the cavity facing towards the keyboard support member and a second portion of the display screen is viewable outside of the cavity and disposed between the first and second sidewalls, and in the extended position the first portion and the second portion of the display screen are viewable outside of the cavity.

Figure 1:
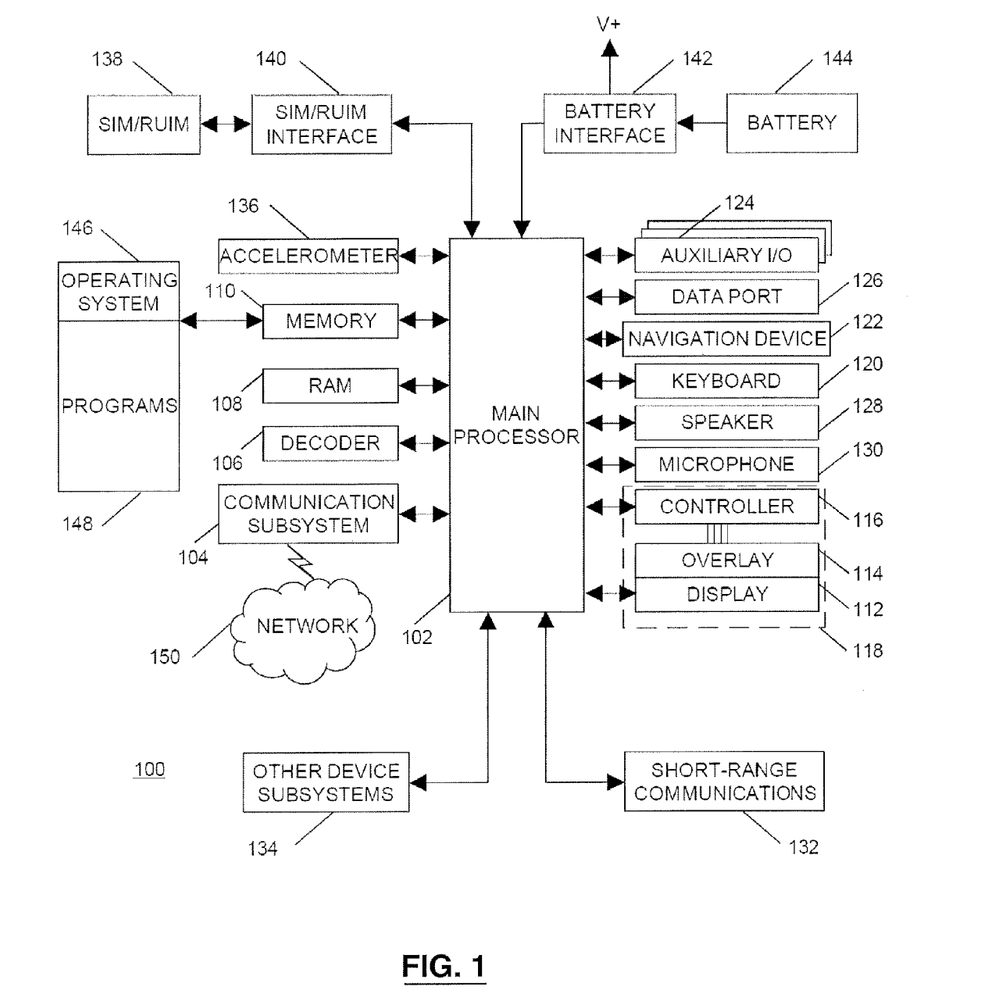
FIG. 1 is a simplified block diagram of components including internal components of a handheld electronic communication device according to an example embodiment.

Referring first to FIG. 1, a block diagram of components of the handheld electronic communication device 100 is shown. The handheld electronic communication device 100 includes multiple components such as a processor 102 that controls the operations of the handheld electronic communication device 100. Communication functions, including data and voice communications, are performed through a communication subsystem 104. Data received by the handheld electronic communication device 100 is decompressed and decrypted by a decoder 106. The communication subsystem 104 receives messages from and sends messages to a wireless network 150. The wireless network 150 may be any type of wireless network, including, but not limited to, data-centric wireless networks, voice-centric wireless networks, and dual-mode networks that support both voice and data communications over the same physical base stations. In some examples, wireless network 150 is a conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX), or various other networks. In some examples, wireless network 150 includes a wireless network which, in some embodiments, conforms to IEEE 802.11x standards (sometimes referred to as Wi-Fi) such as, for example, one or more of the IEEE 802.11a, 802.11b, 802.11g and 802.11n standards. Other communication protocols may be used for the network 150 include for example IEEE 802.20 (also referred to as Mobile Wireless Broadband Access). In some examples communication subsystem 104 could include two or more communications subsystems for communicating with two or more different types of wireless networks—for example a wireless wide area network communication subsystem for EDGE or GPRS communications and a wireless local area network communication subsystem for Wi-Fi communications. The handheld electronic communication device 100 is a battery-powered device and includes a battery interface 142 for receiving one or more rechargeable batteries 144.

The processor 102 also interacts with additional subsystems such as a Random Access Memory (RAM) 108, a flash memory 110, a display 112 with a touch-sensitive overlay 114 connected to an electronic controller 116 that together comprise a touch-sensitive display 118, an input device such as keyboard 120, an optional navigation device 122, an auxiliary input/output (I/O) subsystem 124, a data port 126, a speaker 128, a microphone 130, short-range communications 132 (which for example could include a Bluetooth™ interface or infrared interface, among other things) and other device subsystems 134. User-interaction with the graphical user interface may be performed through the touch-sensitive overlay 114. The processor 102 interacts with the touch-sensitive overlay 114 via the electronic controller 116. Information, such as text, characters, symbols, images, icons, and other features that may be displayed or rendered on a handheld electronic communication device, are displayed on the touch-sensitive display 118 via the processor 102. The processor 102 may also interact with an accelerometer 136 as shown in FIG. 1. The accelerometer 136 may include a cantilever beam with a proof mass and suitable deflection sensing circuitry. The accelerometer 136 may be utilized for detecting direction of gravitational forces or gravity-induced reaction forces. Although the touch-sensitive display 118 is described as comprising a display 112 and an overlay 114, the touch-sensing components may overlay the display 112 or, alternatively, may be integrated into the display 112.

To identify a subscriber for network access according to the present embodiment, the handheld electronic communication device 100 uses a Subscriber Identity Module or a Removable User Identity Module (SIM/RUIM) card 138 inserted into a SIM/RUIM interface 140 for communication with a network such as the wireless network 150. Alternatively, user identification information may be programmed into the flash memory 110.

The handheld electronic communication device 100 also includes an operating system 146 and software components 148 that are executed by the processor 102 and are typically stored in a persistent store such as flash memory 110. Additional applications may be loaded onto the handheld electronic communication device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104. For voice communications, the overall operation of the handheld electronic communication device 100 is similar. The speaker 128 outputs audible information converted from electrical signals, and the microphone 130 converts audible information into electrical signals for processing.

Figures 2, 3:
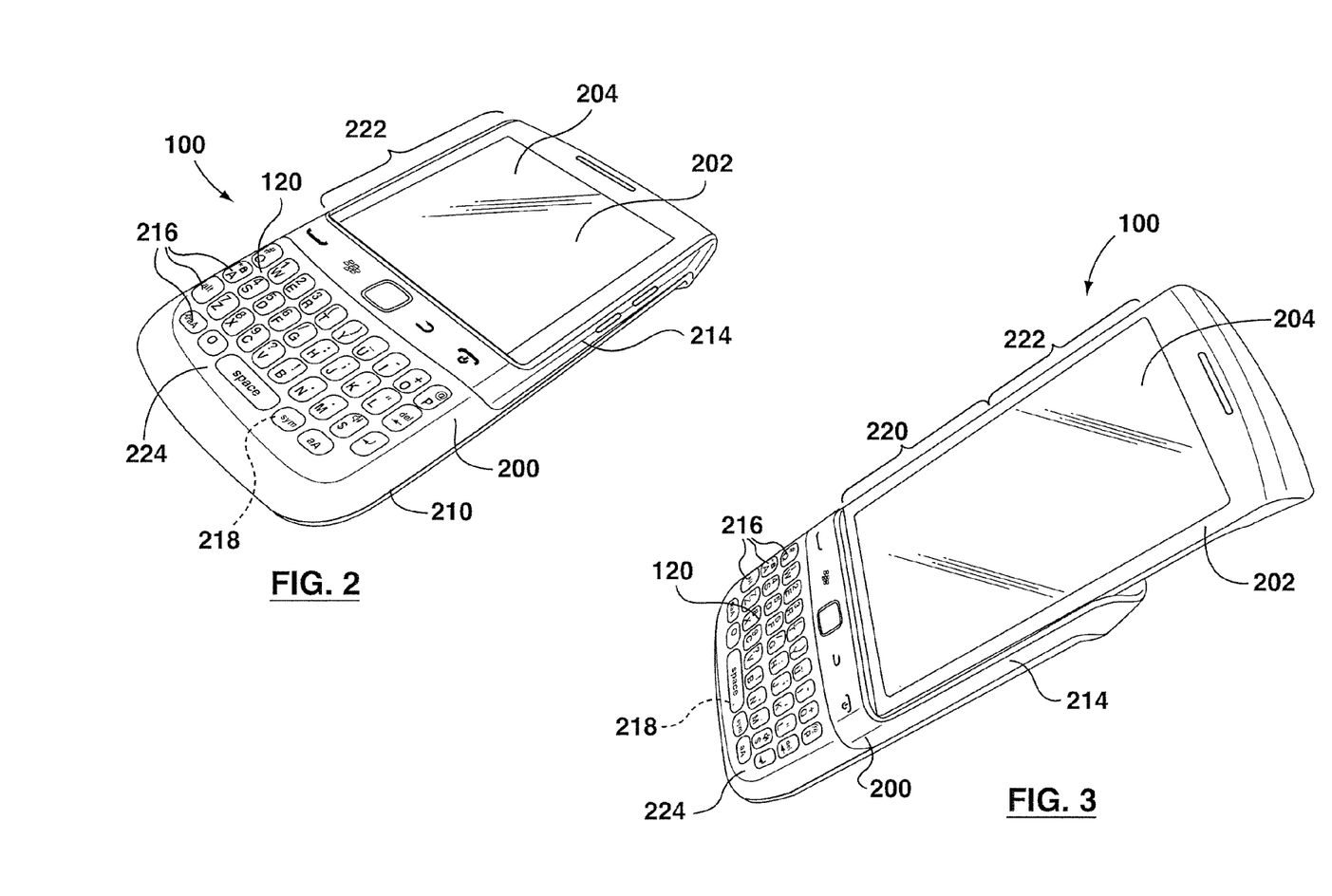
FIG. 2 is a perspective view of an example of a handheld electronic communication device including a display assembly in a retracted position.
FIG. 3 is a perspective view of the handheld electronic communication device of FIG. 2 showing the display assembly in an extended position.
Figure 10:
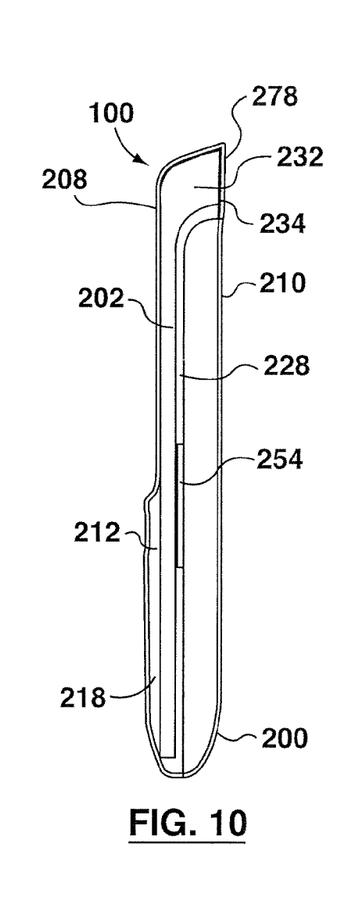
FIG. 10 is a schematic sectional view of the handheld electronic communication device of FIG. 2, taken along lines X-X of FIG. 4A.

Referring to FIGS. 2, 3, 4A-4D and 5A-5D views of an example of the handheld electronic communications device 100 are shown. The handheld electronic communication device 100 includes a housing 200 having a longitudinal axis and a sliding display screen assembly 202 that is mounted to the housing to slide axially between a retracted position as shown in FIGS. 2 and 4A-4D and an extended position as shown in FIGS. 3 and 5A-5D. The housing 200 includes a base 210 and a keyboard support member 224 in which a plurality of forward facing user input keys 216 of the keyboard 120 are disposed. A cavity 218, as best seen in sectional view of FIG. 10, and indicated by dashed reference line in FIGS. 2 and 3, is defined between a front surface of the base 210 and a back surface of the keyboard support member 224. The sliding display assembly 202 includes a display screen 204 (which in one example includes display 112 and touch sensitive overlay 114) on its front face. The display screen 204 has a first or lower portion 220 and a second or upper portion 222. When the display assembly 202 is in the retracted position as shown in FIG. 2, the lower portion 220 of the display screen 204 is received within the cavity 218 of housing 200 underlying the keyboard support member 224 such that the lower portion 220 is hidden from view, and the upper portion 222 of the display screen 204 extends from an open end of the cavity 218 and is exposed and viewable from a front of the device. When the display assembly 202 is in the extended position as shown in FIG. 3, the lower portion 220 of the display assembly is positioned out of the cavity 218 such that both the lower portion 220 and the upper portion 222 of the display screen 204 are viewable.

The sliding display assembly 202 may in at least some examples enable a compact size for the handheld electronic communication device 100 when the display assembly is retracted while providing a larger viewable display screen area when the display assembly is extended. The keyboard 120 is exposed and fully accessible from a front of the handheld electronic communication device 100 when the display assembly 202 is in both the retracted and extended positions.

Figures 6A, 6C:
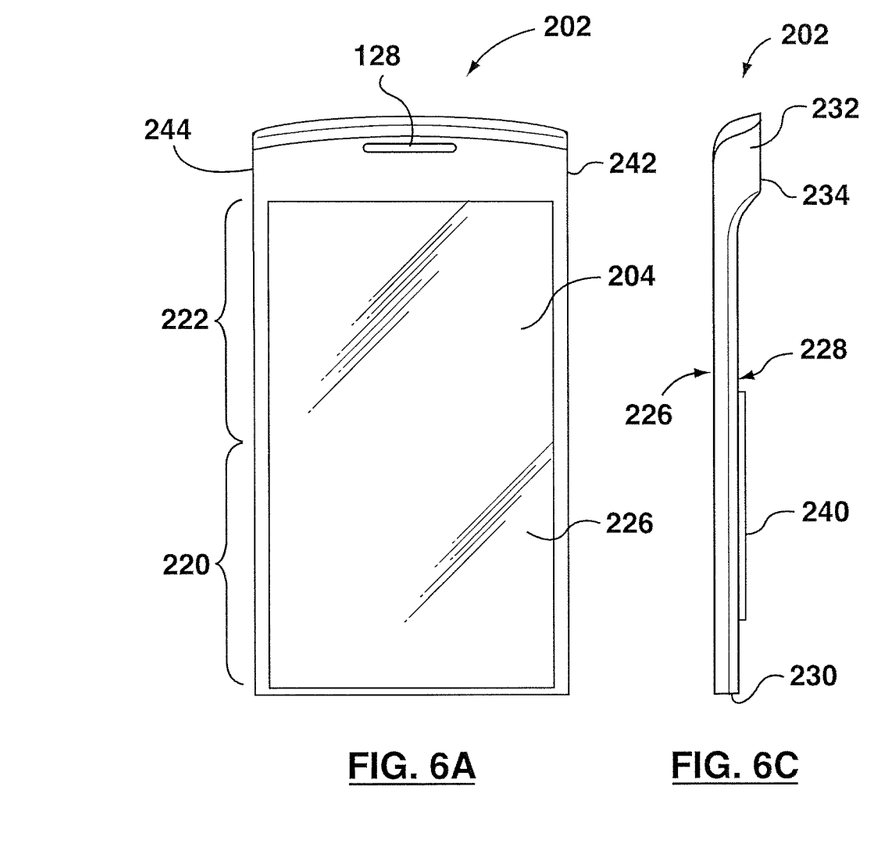
FIG. 6A is a front view of a display assembly of the handheld electronic communication device of FIG. 2.
FIG. 6C is a side view of the display assembly of FIG. 6A.
Figure 6B:
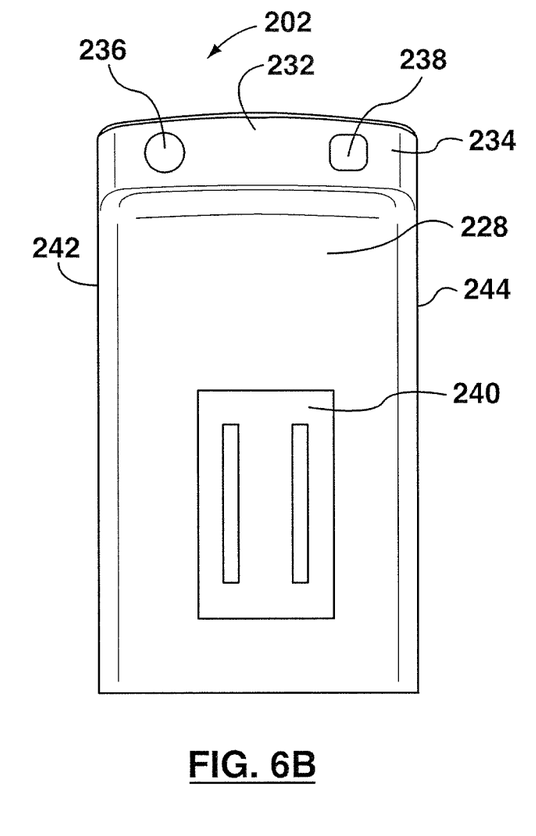
FIG. 6B is a back view of the display assembly of FIG. 6A.

The housing 200 and the display assembly 202 may both house components of the handheld electronic communication device 100, including the components described and shown in FIG. 1. Referring to FIGS. 6A-6C, an example of the display assembly 202 will now be explained in greater detail. The display assembly 202 has a first or lower terminal end 230 that is received within the housing cavity 218 at least when the display assembly 202 is in the retracted position, and a second or upper terminal end 232 at its opposite end. The display assembly 202 has a substantially planar front face 226 which includes a viewable surface of the display screen 204, an opposite facing back face 228 and longitudinal side edges 242 and 244. The back face 228 is substantially planar over most of the length of the display assembly 202, however the upper terminal end 232 defines an enlarged boss portion 234 that has a back face that is spaced further back from the display assembly front face 226 than the rest of the back face 228. In one example, the enlarged boss portion 234 houses an optical sensor 236 that faces outward from the back face of the display assembly 202 for capturing one or both of photo or video image data. A flash or illuminator 238 may also be housed in the enlarged boss portion 234 for illuminating objects that are the subject of image capture by the optical sensor 236.

Figure 4A:
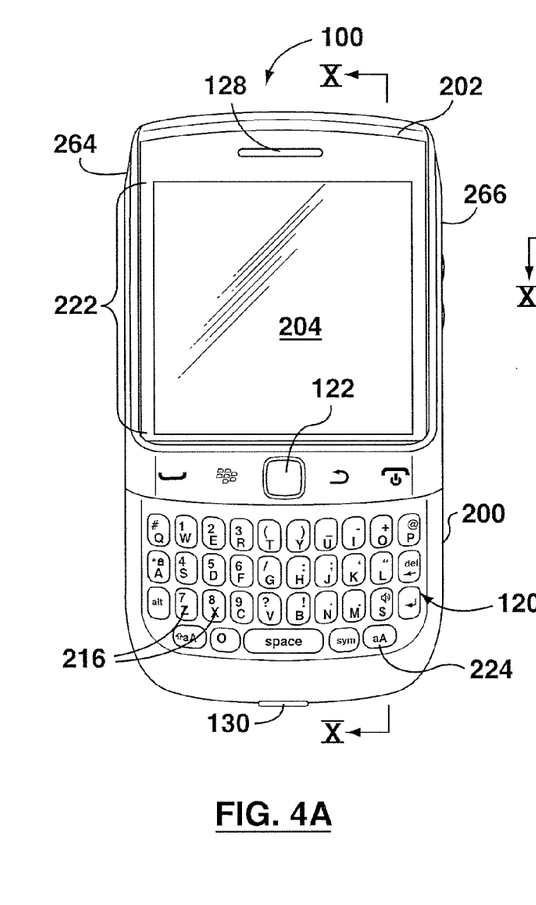
FIG. 4A is a front view of the handheld electronic communication device of FIG. 2 showing the display assembly in the retracted position.
Figure 4B:
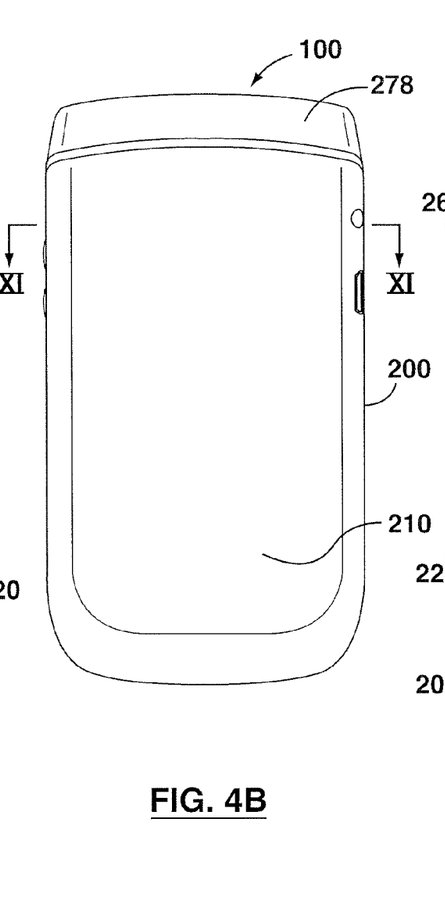
FIG. 4B is a back view of the handheld electronic communication device of FIG. 2 showing the display assembly in the retracted position.
Figure 5A:
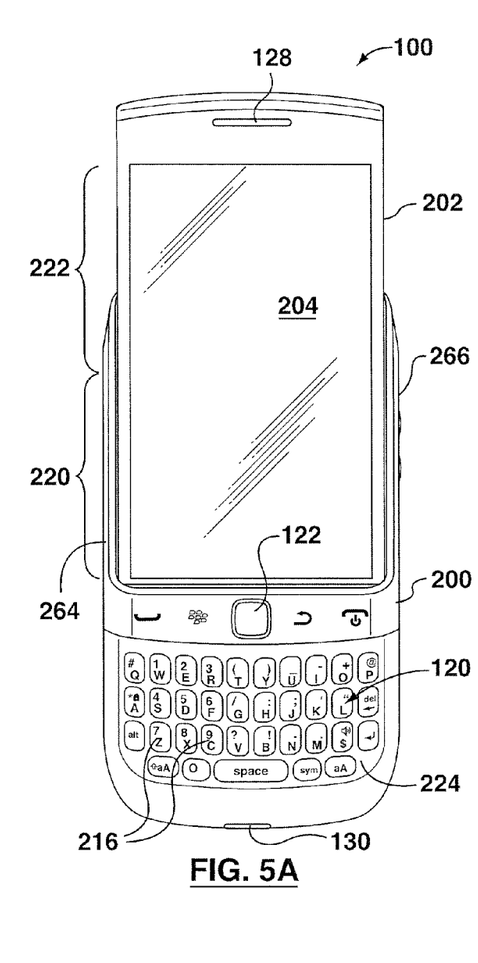
FIG. 5A is a front view of the handheld electronic communication device of FIG. 2 showing the display assembly in the extended position.
Figure 5B:
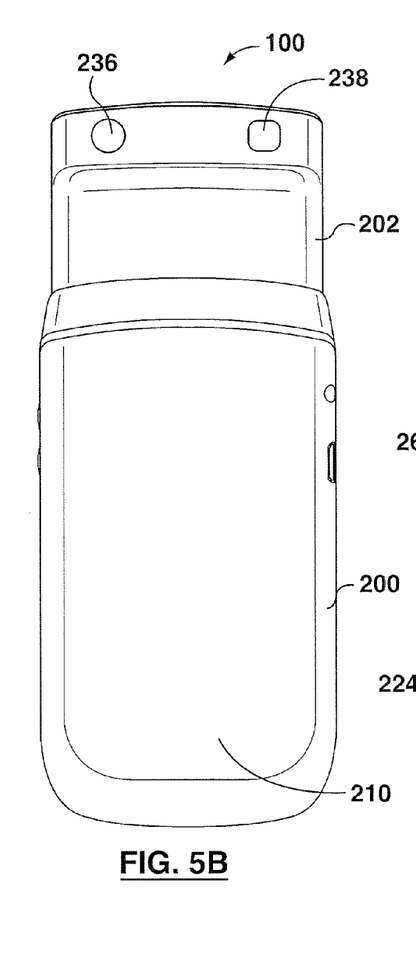
FIG. 5B is a back view of the handheld electronic communication device of FIG. 2 showing the display assembly in the extended position.
Figures 5C, 5D:
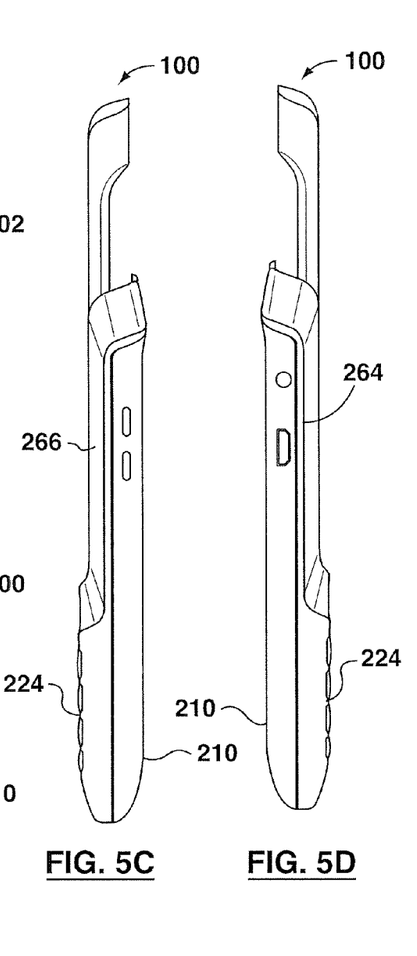
FIG. 5C is a right side view of the handheld electronic communication device of FIG. 2 showing the display assembly in the extended position.
FIG. 5D is a left side view of the handheld electronic communication device of FIG. 2 showing the display assembly in the extended position.

As can be seen in the retracted position back view of FIG. 4B and the extended position back view of FIG. 5B, in at least some examples the optical sensor 236 and illuminator 238 are concealed by the housing 200 when the display assembly 202 is in its retracted position, but are exposed when the display assembly 202 is in its extended position.

Referring again to FIGS. 6A to 6C, in the illustrated example, device speaker 128 is housed in the enlarged boss portion 234 at the upper end 232 of the display assembly 202, and is oriented to output sound from the upper end 232 of the front face 226. In some examples, a sliding assembly member 240 is provided on the back face 228 of the display assembly 202 for sildably mounting the display assembly to a front face of the housing base 210.

Figures 4C, 4D:
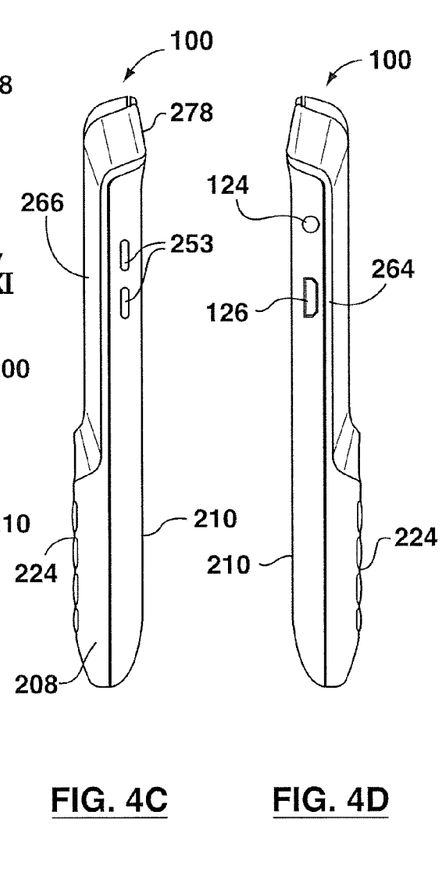
FIG. 4C is a right side view of the handheld electronic communication device of FIG. 2 showing the display assembly in the retracted position.
FIG. 4D is a left side view of the handheld electronic communication device of FIG. 2 showing the display assembly in the retracted position.
Figure 7:
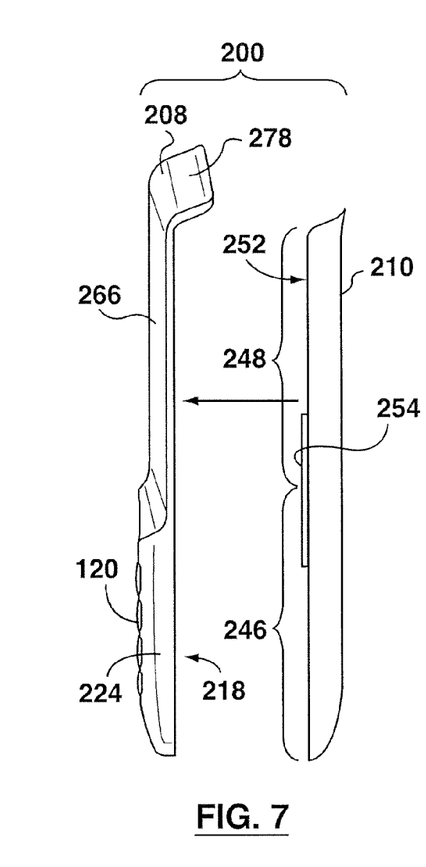
FIG. 7 is an exploded side view of a housing of the handheld electronic communication device of FIG. 2.
Figure 8:
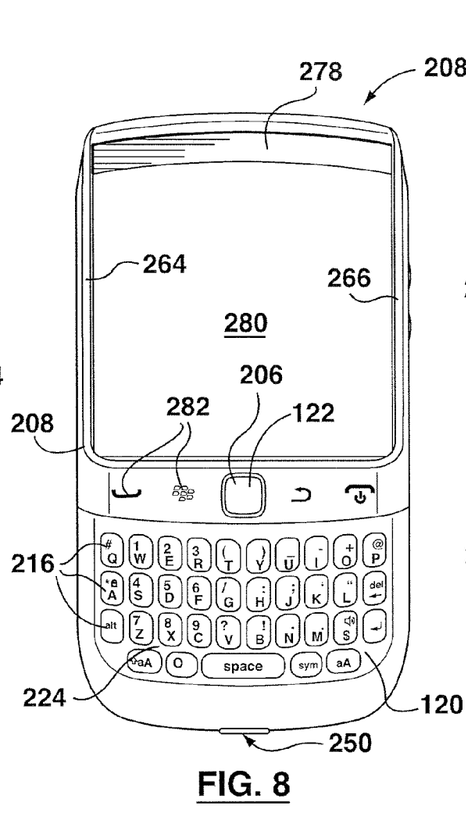
FIG. 8 is a front view of a front housing member of the housing of FIG. 7.
Figure 9:
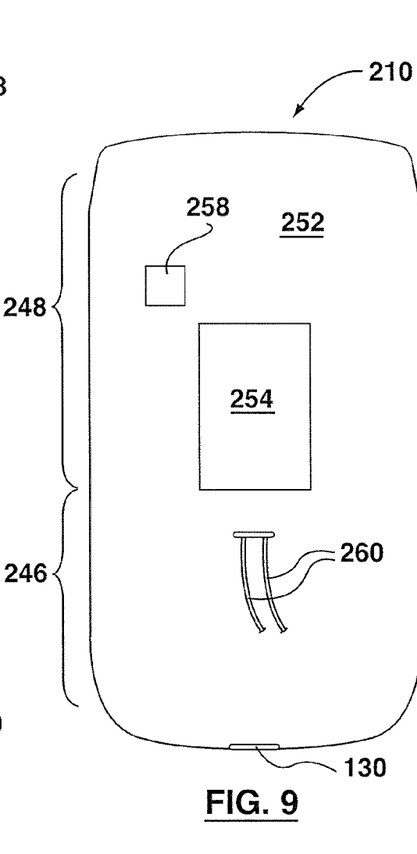
FIG. 9 is a front view of a base of the housing of FIG. 7.

Referring to FIGS. 7-9, an example of the housing 200 will now be explained in greater detail. As noted above, the housing 200 includes a base 210 and a keyboard support member 224. In one example, the keyboard support member 224 is part of a front housing unit 208. As shown in FIGS. 7 and 9, base 210 has substantially planar front face 252 with a first or lower section 246 and a second or upper section 248. The front face of the base lower section 246 is arranged in spaced opposition to the keyboard support member 224 to form cavity 218, and the base upper section 248 extends from the first section 246 beyond the open end of the cavity 218. The front face of upper section 248 faces the back face 228 of the display assembly 202. In some examples of handheld communication device 100, many of the components of the device shown in FIG. 1 are located within the base 210 including for example the main processor 102, RAM 108, memory 110, and communication subsystems 104 and 132. In one example, microphone 130 is located at a lower end of the base as illustrated in FIG. 9. An opening or slot 250 (see FIG. 8) may be provided in a lower end of the front housing unit 208 in alignment with the microphone 130. One or more antennas of one or both of the communications subsystem 104 and 132 may also be positioned at or near the lower end of the base 210. In some example embodiments, one or more data ports 126 and auxiliary I/O interfaces 124 can be provided on side edges of the base 210. For example, as seen in FIG. 4D, a data port 126 in the form of a USB port and an I/O interface 124 in the form of an audio/microphone jack are provided on a side edge of the upper section of base 210. As seen in FIG. 4C, physical user input buttons such as volume control buttons 253 that are operatively connected to the processor 102 can also be located on side edges of the base 210.

Referring again to FIG. 9, a slider assembly member 254 can be provided on the front face 252 of the base 210. The slider assembly member 254 of the base 210 cooperates with the slider assembly member 240 of the sliding display assembly 202 to collectively provide a sliding assembly 256 (FIG. 10) that slidably connects the display assembly 202 to the base 210. Any different number of known sliding assembly configurations could be used to implement sliding assembly 256, including but not limited to slider assemblies that incorporate one or both of springs and or electric motors to assist in moving the sliding component and retaining the sliding component in a desired position. In at least some examples a flex connector 260 extends between the base 210 and the sliding assembly 256 to provide an electrical link between components housed within the display assembly 202 and components housed within the base 210. In some example configurations, other communications links could be provided between base components and display assembly components, including for example optical or RF links.

One or more position sensors 258 can be provided on the base 210 or the display assembly 202 for detecting the position of the display assembly 202 relative to the housing 200. For example, a Hall effect sensor may be utilized to detect a position or positions of the display assembly 202 relative to the housing 200. According to another example, a mechanical switch or switches are used.

With reference to FIGS. 7 and 8, the keyboard support member 224 forms a lower portion of front housing unit 208 and supports keyboard 120. In one example, keyboard 120 includes a plurality of depressible alphanumeric keys 216 which may be arranged in rows and columns with a standard keyboard layout (e.g. QWERT, DVORAK, etc.). In some examples, the keyboard 120 may include a respective dome switch associated with each of the keys 216, however many different keyboard configurations could be used to implement keyboard 120.

In one example embodiment, a number of function keys 282 and a navigation device 122 are provided in a row along on the keyboard support member 120 between the keyboard 120 and the display screen. Function keys 282 are operatively connected to the processor 102 to initiate predetermined device functions such as initiate a phone call, terminate a phone call, and return to previous screen, among other things. The navigation device 122 responds to user interaction and can be used for navigating around the display screen 204, to select objects on the display screen 204 and for other purposes. The navigation device 122 can act as a cursor navigational tool and in some examples, the navigation device 122 can consist of an optically based user input device such as an optical joystick that uses an optical sensor pad 206 to detect relative movements of a finger. The optically based navigation device 122 can be used to instruct two-dimensional screen cursor movement in substantially any direction, as well as act as an actuator when the optically based navigation device 122 is depressed like a button. In some examples, where an optical sensor pad is used to implement navigation device 122, the optical sensor pad has a low profile so that it is generally flush with the front of the keyboard support member 224 and does not protrude extensively behind the keyboard support member. In some examples, navigation device 122 could alternatively be a trackball, touchpad, physical joystick, directional keys or key pad.

In an example, the front housing unit 208 includes opposed first and second sidewalls 264 and 266 that extend from the keyboard support member 224 along respective axial side edges of the upper section 248 of base 210. At the upper end of the housing unit, the sidewalls 264 and 266 are connected by a cross member 278. The cross member 278, sidewalls 264 and 266 and keyboard support member 224 collectively define a rectangular opening 280 through which the display assembly 202 can be viewed. Referring to the sectional view of FIG. 11, in one example sidewalls 264 and 266 each protrude away from the front face 252 of base 210 so that the screen assembly 202 is located between the sidewalls 264 and 266. As can be seen in FIG. 4A, when the screen assembly 202 is in its retracted position, the upper portion 222 of the display screen 204 is located between sidewalls 264 and 266 with the side edges of the screen assembly 202 concealed by sidewalls 264 and 266. In the extended position, as seen in FIG. 5A, at least part of the upper portion 222 of the display screen extends beyond the upper ends of the sidewalls 264.

Figure 11:
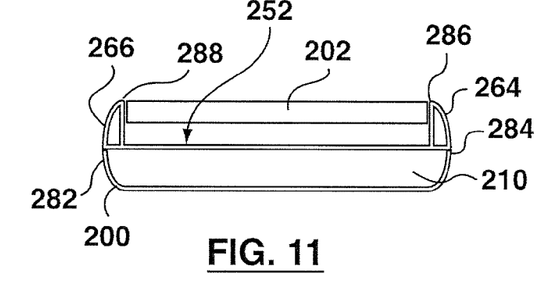
FIG. 11 is a schematic sectional view of the handheld electronic communication device of FIG. 2, taken along lines XI-XI of FIG. 4B

Referring again to the sectional view of FIG. 11, in one example, an outer surface of the sidewall 266 together with an outer side edge surface 282 of the base 210 forms one side edge of the communication device 100 and an outer surface of the sidewall 264 together with an outer side edge surface 284 of the base 210 forms an opposite side edge of the communication device 100. In one example, along the sides of rectangular opening 280 (FIG. 8) the terminal edges 286, 288 of the sidewalls 264, 266 that face away from the front surface 252 of the base 210 are located in plane that is slightly higher than a front viewing surface of the display screen 204. In another example, along the sides of rectangular opening 280 the terminal edges 286, 288 of the sidewalls 264, 266 that face away from the front surface 252 of the base 210 are located in plane that is substantially flush with a front viewing surface of the display screen 204.

Referring again to FIGS. 7, 8 and 10, in one example the cross member 278 that extends between the upper ends of the sidewalls 264, 266 is offset back towards the base 210 relative to the sidewalls 264, 266 such that the cross member 278 is located behind the back face of the enlarged boss portion 234 of the upper end 232 of the display assembly 202. In such an example, the cross member 278 forms the upper terminal end of the housing 200 and provides a recess in the housing 200 for receiving the enlarged display assembly boss portion 234 when the display assembly is in its retracted position, and conceals the optical sensor 236 and illuminator 238 that are located the back face of the enlarged boss portion 234. As seen in FIGS. 4C and 4B, when the display assembly 202 is in its retracted position its upper end 232 is coterminous with the upper end of the housing 200 such that the housing 200 covers substantially the entire back surface of the display assembly 202.

In one example, the sidewalls 264, 268 protect the side edges of the display assembly 202 when the display assembly is in its retracted position, and also provide opposed surfaces for gripping the handheld electronic communication device 100 between the palm and fingers of a hand without interfering with movement of the display assembly. In one embodiment the sidewalls 264, 268 are respectively spaced apart such that a user can grip one side edge of the communication device 100 with fingers of a hand, grip the opposite side edge with the palm of the same hand and have the thumb free to either extend or retract the display assembly 202 or actuate the navigation device 122.

As indicated above the communication device 100 may include one or more sensors 258 that indicate one or more relative positions of the display assembly 200 to the processor 102. In examples the processor 102 is configured to modify operational characteristics of the display screen 204 in dependence on the sensed position of display assembly 200. By way of example, where the display screen 204 is an OLED (organic light emitting diode) display having pixels that can be selectively illuminated, when the processor 102 detects that the display assembly 204 is retracted the processor 102 can disable the illumination of pixels that are in the portion of the display screen 204 that is received within recess 218, while still enabling illumination the pixels of upper display screen portion 222. Such a feature may allow power conservation.

In another example, the processor 102 is configured such that when the display assembly 202 is in its extended position the processor 102 will, based on input from accelerometer 136, automatically toggle between displaying information on the display screen 204 in a portrait mode when the communication device 100 is in a first orientation and displaying information on the on the display screen 204 in a landscape mode when the communication device 100 is in a second orientation. However, when the processor 102 detects that the display assembly 202 is in the retracted position, the processor disables landscape mode so that information is only displayed in portrait mode regardless of the orientation of the communication device 100.

In another example, the processor 102 disables camera functionality when the display assembly 202 is in the retracted position with its optical sensor 236 concealed by the housing.

Figure 12:
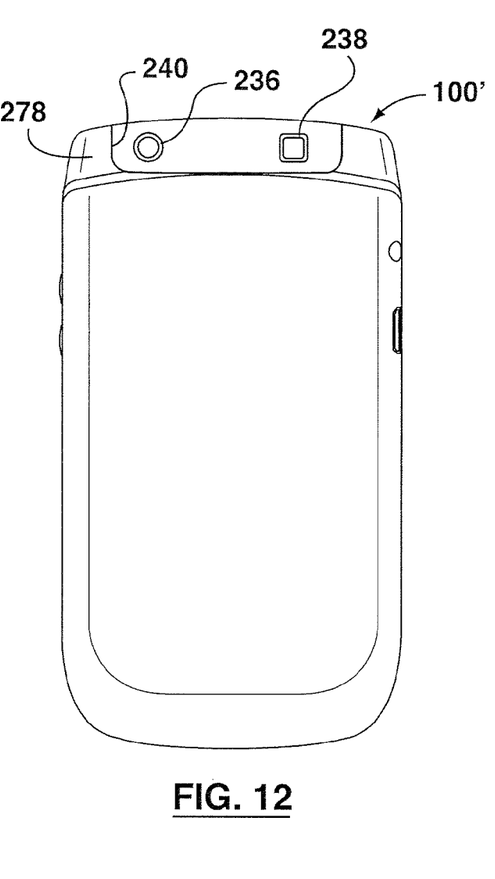
FIG. 12 is a back view of a further example of a handheld electronic communication device, showing the display assembly in the retracted position

FIG. 12 illustrates a back view of another example of a handheld electronic communication device 100' that is substantially identical to handheld electronic communication device 100 except the back of housing 200 defines an opening 290 that exposes optical sensor 236 and illuminator 238 when display assembly 202 is in its retracted position. The opening 290, which for example could be provided by omitting all or a portion of the cross member 278, facilitates the taking of picture and video when the display assembly 202 is in the retracted position.

Figure 13:
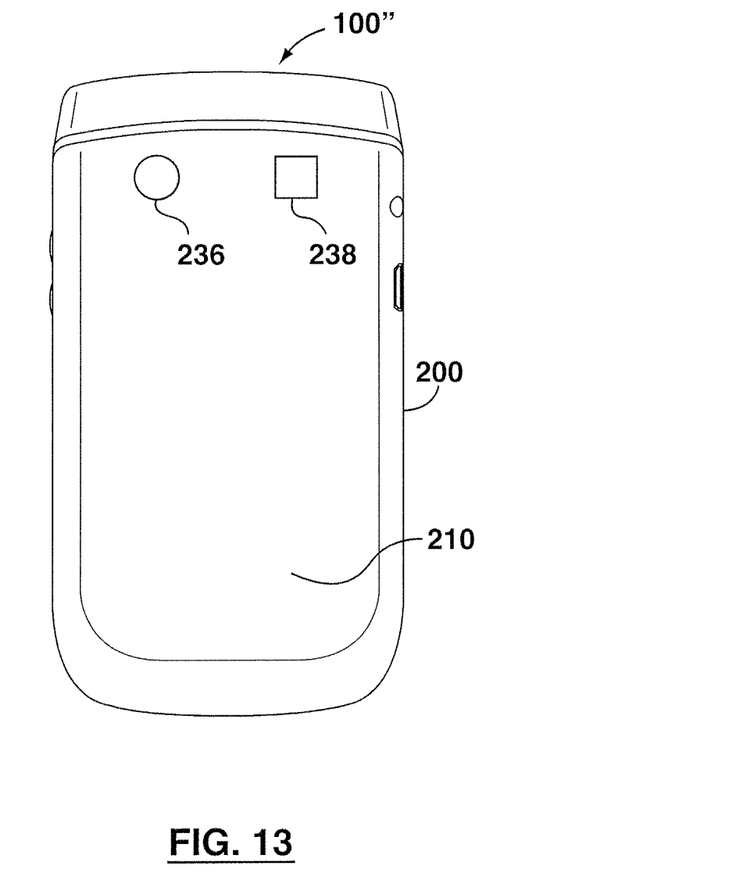
FIG. 13 is a back view of a further example of a handheld electronic communication device, showing the display assembly in the retracted position.

FIG. 13 illustrates a back view of another example of a handheld electronic communication device 100" that is substantially identical to handheld electronic communication device 100 except that the image sensor 236 and illuminator 238 are located on the back of housing 200 rather than the sliding display assembly 202. In such a configuration, the image sensor 236 and illuminator 238 are exposed regardless of the position of the display assembly.

While the embodiments described herein are directed to particular implementations of the actuating assembly and the handheld electronic communication device and the, it will be understood that modifications and variations may occur to those skilled in the art. All such modifications and variations are believed to be within the sphere and scope of the present disclosure.

What is claimed is:

1. A handheld electronic device comprising:
   a housing comprising a keyboard support member and a base, the base having a first section spaced apart from and opposing the keyboard support member to define a cavity therebetween, the base having a second section that extends from the first section beyond an open end of the cavity, the housing further comprising opposed first and second sidewalls, the first sidewall protruding from a first peripheral side edge of the second section of the base and the second sidewall protruding from a second peripheral side edge of the second section of the base; and
   a display assembly slidably mounted to the housing and comprising a display screen on a front face thereof, the display assembly being slidable between a retracted position and an extended position, wherein in the retracted position a first portion of the display screen is received within the cavity facing towards the keyboard support member and a second portion of the display screen is viewable outside of the cavity and disposed between the first and second sidewalls, and in the extended position the first portion and the second portion of the display screen are viewable outside of the cavity;

wherein the first and second sidewalls have peripheral outer surfaces, the peripheral outer surfaces having terminal edges facing away from the base that are substantially flush with a viewing surface of the display screen, wherein a sliding assembly member is provided on a back face of the display screen, the member slidably mounting the display assembly to the housing, and wherein the member extends outwardly from the back face of the display screen, thereby causing the viewing surface of the display screen to be substantially flush with the terminal edges of the first and second sidewalls.

2. The electronic device of claim 1 wherein the first and second sidewalls of the housing substantially conceal opposite side edges of the display assembly that are outside of the cavity when the display assembly is in the retracted position.

3. The electronic device of claim 1 wherein the first and second sidewalls are dimensioned to be simultaneously gripped by a user's hand.

4. The electronic device of claim 1 wherein the display assembly includes an optical sensor for capturing digital image data, the optical sensor being positioned on the back face of the display assembly, wherein the optical sensor is covered by the housing when the display assembly is in the retracted position and exposed when the display assembly is in the extended position.

5. The electronic device of claim 4 wherein the display assembly comprises a first terminal end that is received within the cavity at least when the display assembly is in the retracted position and a second terminal end at an opposite end thereof, the second terminal end defining an enlarged boss portion that extends further back from the front face of the display assembly than a remaining portion of the display assembly, the optical sensor being positioned in the enlarged boss portion.

6. The electronic device of claim 4 comprising:
a processor configured to control operation of the optical sensor; and
a position sensor for indicating to the processor if the display assembly is in the retracted position;
the processor being configured to, when the position sensor indicates the display assembly is in the retracted position, disable use of the optical sensor for capturing images.

7. The electronic device of claim 1 wherein the housing substantially covers an entire back face of the display assembly when the display assembly is in the retracted position.

8. The electronic device of claim 1 wherein the display assembly includes an optical sensor for capturing digital image data on a back face thereof, the optical sensor being exposed for capturing image data both when the display assembly is in the retracted position and when the display assembly is in the extended position.

9. The electronic device of claim 8 wherein an opening is provided on a back of the housing to expose the optical sensor when the display assembly is in the retracted position.

10. The electronic device of claim 1 wherein the display screen is a light emitting diode display screen comprising a plurality of pixels that are selectively illuminatable to display an image.

11. The electronic device of claim 10 comprising:
a processor configured to control operation of the display screen; and
a position sensor for indicating to the processor if the display assembly is in the retracted position;
the processor being configured to, when the position sensor indicates the display assembly is in the retracted position, disable illumination of the pixels in the first portion of the display screen while still enabling illumination of the pixels in the second portion of the display screen.

12. The electronic device of claim 1 comprising:
a processor configured to control operation of the display screen; and
a position sensor for indicating to the processor a position of the display assembly relative to the housing,
the processor being configured to change a display aspect of the display screen in dependence on the indicated position.

13. The electronic device of claim 12 wherein the position sensor device indicates if the display assembly is in the retracted position or the extended position, and the processor is configured to enable switching between a landscape display mode and a portrait display mode when the display assembly position sensor device indicates the display assembly is in an extended position and to disable the landscape display mode and only display in the portrait display mode when the display assembly position sensor device indicates the display assembly is in the retracted position.

14. The electronic device of claim 12 comprising an orientation sensor for indicating an orientation of the electronic device to the processor, wherein when the display assembly is in the extended position the processor is configured to switch between the landscape display mode and the portrait display mode in dependence on a sensed orientation of the electronic device.

15. The electronic device of claim 1 wherein the device is enabled for wireless voice and data communications.

16. The electronic device of claim 1 wherein the keyboard comprises a plurality of physical keys and an optical joystick is supported on the support member, the optical joystick comprising an optical sensor pad for detecting relative movements of a fingertip.

17. A handheld electronic device for wireless voice and data communication, comprising:
a housing having a longitudinal axis and comprising a base having a first section and a second section, and a keyboard support member spaced apart from the first section to form a cavity therebetween, said cavity having an open end adjacent the second section, the second section of the base having a first axial edge, a second axial edge, a first sidewall protruding from the second section along the first axial edge and a second sidewall protruding from the second section along the second axial edge;
a sliding display assembly slidably mounted to the housing and comprising a back face facing the base and a front face opposite the back face, said front face comprising a display screen having a first portion and a second portion;
said display assembly being axially slidable between a retracted position wherein the first portion is received in the cavity underlying the keyboard support member and the second portion of the display screen is disposed between the first and second sidewalls, and an extended position wherein the display assembly is extended from the cavity such that the first portion and the second portion are viewable;

wherein the first and second sidewalls have peripheral outer surfaces, the peripheral outer surfaces having terminal edges facing away from the base that are substantially flush with a viewing surface of the display screen wherein a sliding assembly member is provided on the back face of the display screen, the member slidably mounting the display assembly to the housing, and wherein the member extends outwardly from the back face of the display screen, thereby causing the viewing surface of the display screen to be substantially flush with the terminal edges of the first and second sidewalls.

18. The electronic device of claim 1, wherein a second sliding assembly member is provided on the base of the housing, the second sliding assembly member configured to cooperate with the sliding assembly member provided on the back face of the display screen.

* * * * *